Nov. 15, 1960   W. SYLLA   2,960,203
SPINDLE ARRESTING AND CHUCKING DEVICE
FOR AUTOMATIC MULTISPINDLE LATHES
Filed Aug. 13, 1957   3 Sheets-Sheet 1

INVENTOR
Willi Sylla
BY

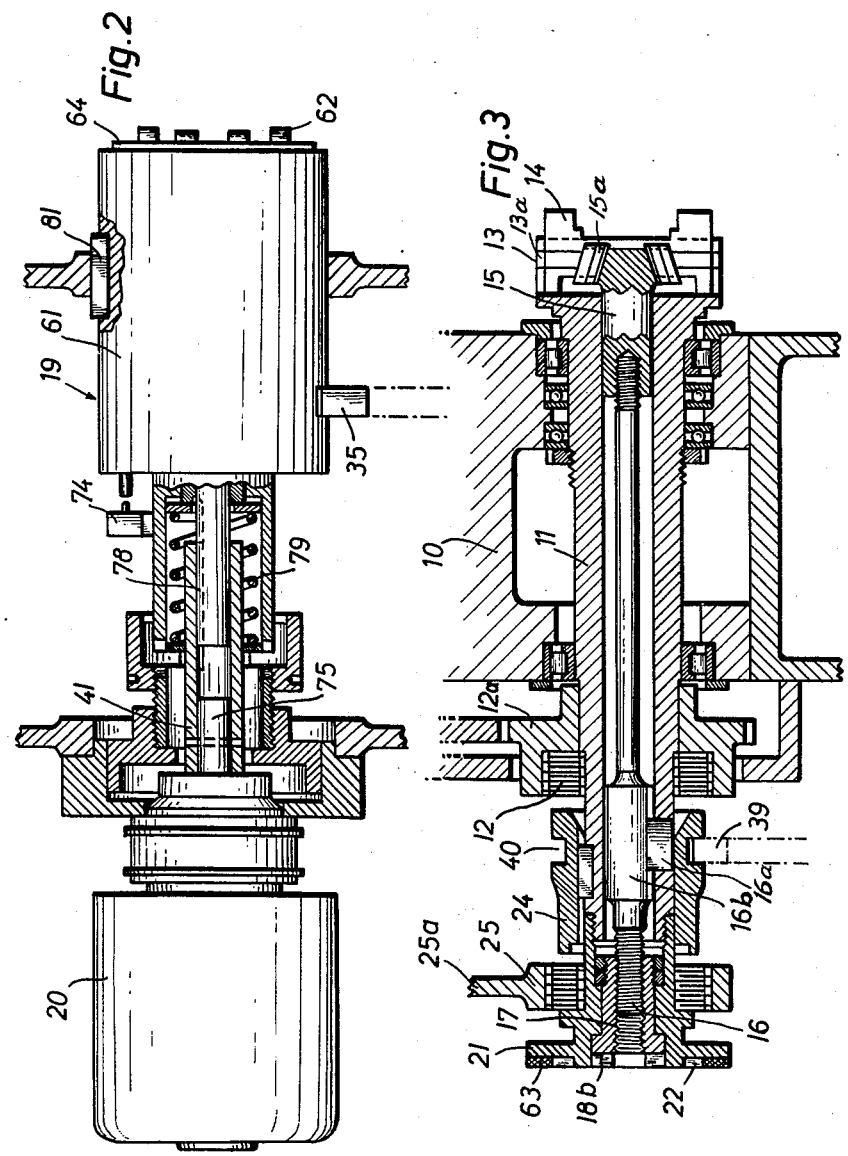

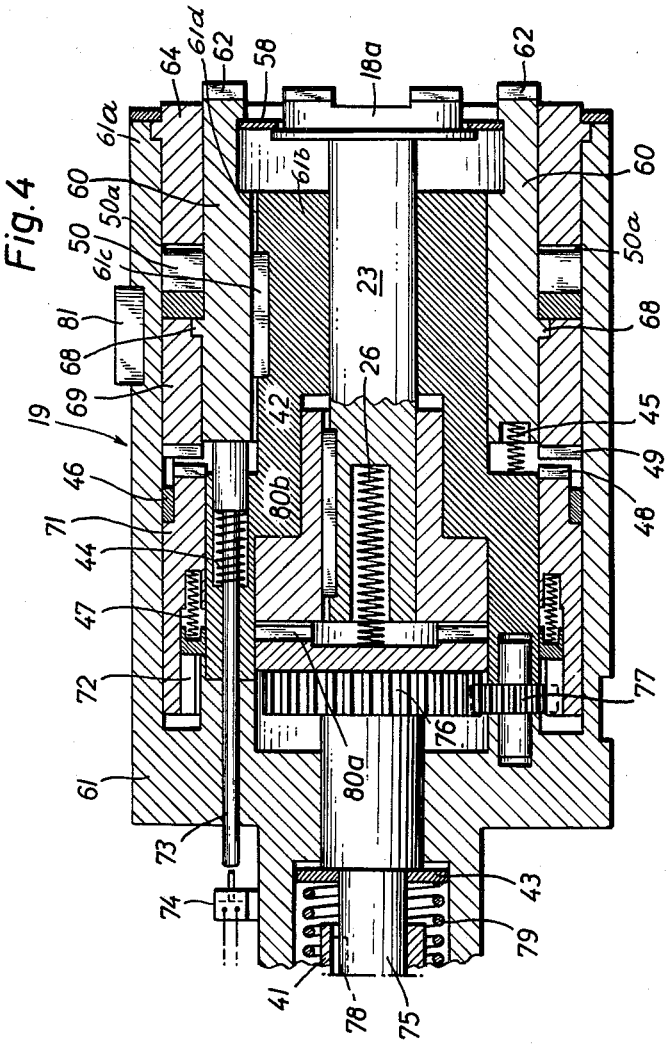

United States Patent Office 2,960,203
Patented Nov. 15, 1960

2,960,203

SPINDLE ARRESTING AND CHUCKING DEVICE FOR AUTOMATIC MULTISPINDLE LATHES

Willi Sylla, Koln-Hohenhaus, Germany, assignor to Alfred H. Schütte, Koln-Deutz, Germany, a German company Filed Aug. 13, 1957, Ser. No. 677,922

Claims priority, application Germany Aug. 27, 1956

9 Claims. (Cl. 192—139)

This invention relates generally to a device for effecting rotation of an inner rotary member following the positioning of a coaxial, outer rotary member at a predetermined rotational position, and more particularly is directed to a spindle arresting and chucking device for automatic multispindle lathes of the kind wherein, at a certain working position of the spindle, the latter is disengaged from its usual rotary drive, braked to a standstill and then, while the braking effect is briefly released, is turned further until it is arrested in a predetermined rotary position by a spring loaded blocking clutch, whereupon a chucking clutch can engage to transmit a rotary drive for actuating the jaws of the chuck.

In a known mechanism for effecting the above operations, the jaws of the chuck are actuated by a first electric motor, while an auxiliary motor is provided for turning the spindle, for example, by means of a friction drive, until the spindle reaches the predetermined rotational position at which the blocking clutch can engage to arrest movement of the spindle.

It is an object of the present invention to provide a spindle arresting and chucking device of the described character wherein a single electric motor is employed both for effecting turning of the spindle to the rotational position wherein the rotational movement of the spindle is arrested, and for actuating the jaws of the chuck following the locational rotating of the spindle, thereby to greatly simplify the structure of the lathe.

In accordance with an aspect of the present invention, a motor and transmission assembly is provided at a working position or station of the lathe for axial alignment with the spindle then disposed at the related working station, and the transmission assembly is movable axially toward and away from the spindle. Further, the transmission assembly and the adjacent end of each of the spindles have the complementary parts of blocking or arresting means and a chucking clutch thereon, as well as the complementary parts of a frictional auxiliary drive for the spindle. The part of the chucking clutch carried by the transmission assembly is spring urged axially in the direction toward the spindle at the related working station so that, when the transmission assembly is moved axially toward the spindle which has been braked to a standstill and the parts of the chucking clutch are not angularly related for engagement with each other, the part of the chucking clutch carried by the transmission assembly is urged rearwardly, or falls back, relative to the remainder of the transmission assembly thereby to close a switch provided in the power supply circuit of the motor so that the latter is then operated to slowly turn the spindle, by way of the frictional auxiliary drive, until the blocking or arresting means is engaged to arrest further turning of the spindle, whereupon the switch is opened in response to engagement of the chucking clutch, and the single motor is then in condition to be energized again for actuating the jaws of the chuck by way of the chucking clutch.

The above, and other objects, features and advantages of the invention, will be apparent in the following detailed description of an illustrative embodiment thereof which is to be read in connection with the accompanying drawings forming a part hereof, and wherein:

Fig. 2 is an enlarged sectional view of the drive for the device of Fig. 1;

Fig. 3 is an enlarged sectional view of the spindle and chucking arrangement of Fig. 1; and Fig. 4 is a longitudinal sectional view, on an enlarged scale, of a transmission assembly included in the device of Fig. 1.

Figure 1:
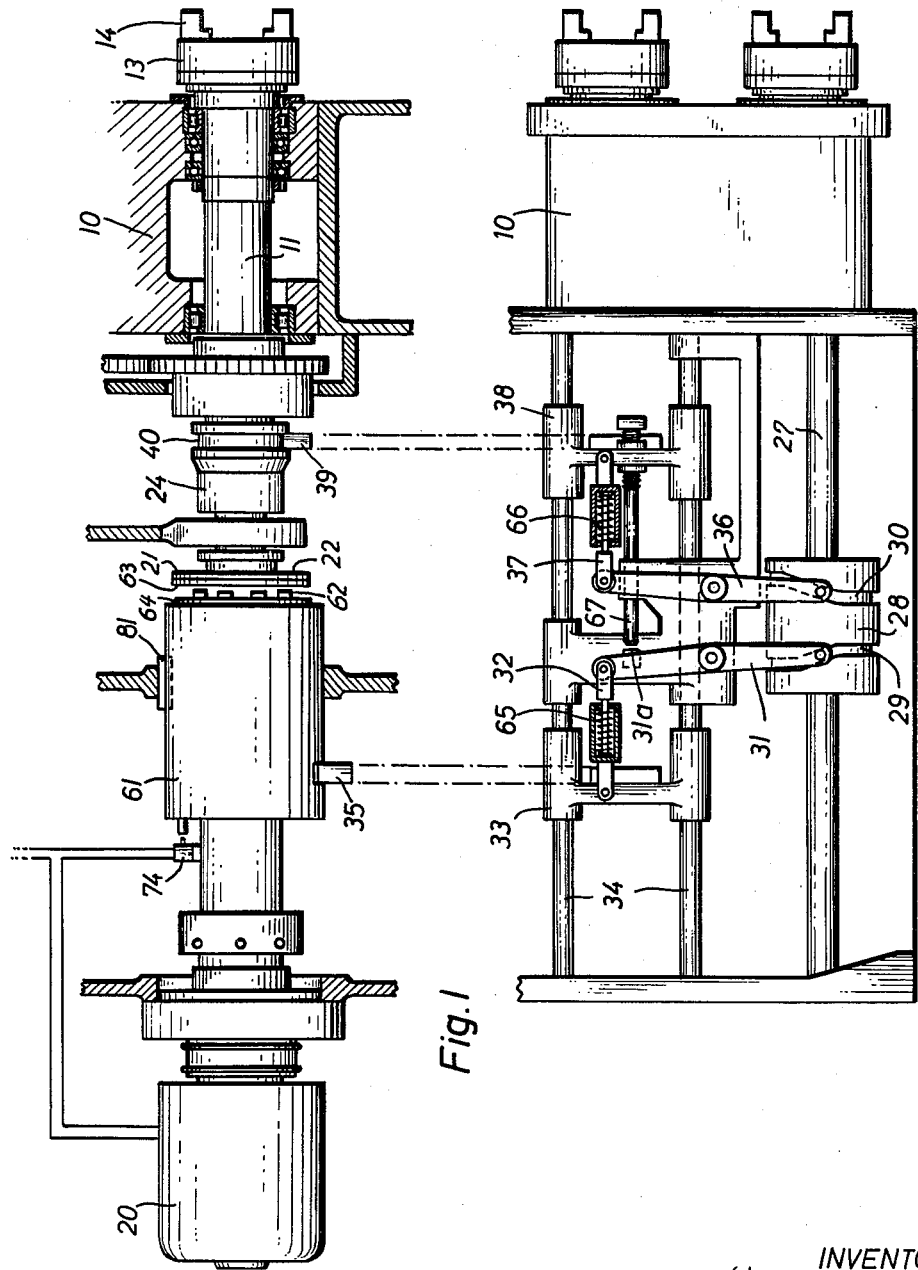
Fig. 1 is a diagrammatic elevational view of a spindle arresting and chucking device embodying the present invention and of the control means therefor.

Referring to the drawings in detail, and initially to Fig. 1 thereof, it will be seen that the present invention is there shown embodied in an automatic multispindle lathe including the usual spindle drum 10 which is capable of being indexed and rotatably supports a plurality of spindles 11 so that the spindles can be successively positioned at a plurality of working stations. When disposed at a working station, the spindle 11 is adapted to be rotated by a conventional main drive that includes a driven gear 12a (Figs. 1 and 3) rotatable on the spindle and a friction clutch 12 (Fig. 3) formed by a series of clutch plates which are alternately connected to the spindle 11 and to the gear 12a so that the driven gear will rotate the spindle only when the plates of the clutch 12 are axially compacted.

Each spindle 11 carries a jaw chuck 13, at its forward end, by which a work piece can be clamped for rotation with the spindle, and the chuck 13 includes jaws 14 which are movable radially in suitable guides 13a of the chuck (Fig. 3) in response to axial displacement of a plunger 15 extending through the spindle 11, thereby to clamp or release the work piece. As is usual, each jaw 14 may engage an inclined cam portion 15a on the plunger 15 which is operative to connect the axial displacement of the latter into radial displacement of the jaw 14 (Fig. 3). The back end of the plunger 15 is connected to a threaded extension 16 having a chucking nut 17 screwed thereon. The chucking nut 17 is rotatable relative to the spindle 11 but is held against axial displacement relative to the latter, whereas rotation of the threaded extension 16 and the plunger 15 relative to the spindle is prevented, for example, by a key 16a engaging a slot in an enlarged portion 16b of extension 16, so that, when the chucking nut 17 is rotated relative to the spindle, the extension 16 and plunger 15 are axially displaced within the spindle, thereby to either release or clamp the jaws 14, depending upon the direction of rotation of the chucking nut.

Each spindle 11 further has a brake 25 associated therewith and including an axial series of brake discs which are alternately connected to the spindle and to a non-rotatable housing 25a so that, when the discs of the brake 25 are axially compacted, rotation of the spindle 11 will be arrested. A control sleeve 24 is axially slidable on the spindle 11 between the clutch 12 and the brake 25 so that, when the sleeve 24 is axially displaced in the direction toward the clutch 12, the latter is engaged and the brake 25 is released, thereby to provide for the normal rotation of the spindle 11, and, when the sleeve 24 is moved axially in the direction toward the brake 25, the latter is applied while the clutch 12 is disengaged, thereby to bring the spindle 11 to a standstill.

In accordance with the present invention, the automatic multispindle lathe is provided, at least at one working station thereof, with an electric motor 20 and transmission assembly 19 (Figs. 1 and 2) which are axially aligned with the spindle at the related working station and which operate first to bring the spindle to a predetermined rotational position and then to actuate the chuck 13.

As shown in Figs. 1, 2 and 4, the transmission assembly 19, in accordance with the present invention, includes a transmission box 61 which is movable axially toward and away from the back end of the spindle 11 at the related working station and is held against rotation, for example, by a key 81. The transmission box 61 includes an outer cylindrical portion 61a and an inner, generally cylindrical portion 61b which is coaxial with respect to the outer portion 61a and joined to the latter at one end. An entraining sleeve 64 is rotatably mounted within the outer portion 61a of transmission box 61 and projects from the forward end of the latter so as to be adapted for frictional engagement with a friction disc 63 provided on the back surface of a radial, outwardly directed flange 21 formed on the back end of spindle 11 (Figs. 1 and 3). A sleeve 60 (Fig. 4) is disposed within the entraining sleeve 64, but is held against rotation relative to the box 61, while being free to move axially relative to the latter by means of a key 61c engaging in a keyway 61d formed in the outer surface of portion 61b of the transmission box. Dogs 62 (Figs. 1, 2 and 3) project axially from the forward end of the sleeve 60 and are adapted to engage in related recesses 22 formed in the rear face of the flange 21 (Fig. 3), so that the recesses 22 and the dogs 62 cooperate to provide a blocking or arresting means which, when engaged, is operative to hold the spindle 11 in a predetermined rotational position while the jaws 14 of the chuck 13 are actuated in response to rotation of the chucking nut 17.

In order to provide for rotation of the chucking nut 17, the transmission assembly 19 further includes a central shaft 23 (Fig. 4) disposed within the inner portion 61b of box 61 and mounted for both rotation and axial movement relative to the latter. The complementary parts of a chucking clutch are provided on the forward end of shaft 23 and the chucking nut 17, respectively. For example, the chucking clutch may consist of a clutch member 18a (Fig. 4) carried by the forward end of the shaft 23, and cooperating recesses or teeth 18b provided on the back end of the chucking nut 17 (Fig. 3). The shaft 23 is urged axially forward relative to the transmission box 61 by a spring 26, and a retaining ring 58 is provided within the sleeve 60 of the blocking clutch and is engageable with the periphery of the clutch member 18a, as shown in Fig. 4, in order to limit the forward projection of the latter with respect to the dogs 62 of the blocking clutch.

In order to drive the shaft 23 from the motor 20, the latter is provided with a hollow shaft 41 (Fig. 2) which opens forwardly and has a shaft 75 slidable axially therein but rotatable with the shaft 41 by reason of a key and slot connection 78 therebetween. The forward end of shaft 75 carries a clutch member 80a which is engageable axially with a clutch member 80b (Fig. 4) keyed, as at 42, to the shaft 23, and a helical compression spring 79 (Figs. 2 and 4) acts forwardly against a collar 43 on the shaft 75 thereby to yieldably urge the clutch member 80a into engagement with the clutch member 80b so that the rotational drive of the motor 20 is thereby transmitted to the clutch member 18a. Preferably, the clutch members 80a and 80b have teeth with oblique or inclined engaging faces so that, when the rotation of the motor 20 is transmitted to the chucking nut 17 by way of the chucking clutch, as will hereinafter be described in detail, and the jaws 14 of chuck 13 are moved into clamping engagement with a work piece, the shaft 75 will be able to move backwardly to permit slipping of the teeth of the clutch members 80a and 80b upon the attainment of a predetermined clamping pressure dependent upon the force exerted by the spring 79.

If the brake 25 brings the spindle 11 to rest in a rotational position where the recesses 22 in the flange 21 register with the dogs 62 of the blocking clutch, then, when the transmission box 61 is moved forwardly in a manner hereinafter described in detail, the dogs 62 will enter the recesses 22 to hold the spindle 11 against rotation, while the complementary parts 18a and 18b of the chucking clutch will engage to permit transmission of the drive from the motor 20 to the chuck 13. On the other hand, if the dogs 62 do not register with the recesses 22 when the transmission box 61 is moved forwardly, the engagement of the dogs 62 with the face of the flange 21 between the recesses 22 will cause rearward movement of the sleeve 60 relative to the forwardly moved transmission box 61, and such rearward relative movement is yieldably opposed by compression springs 45 (Fig. 4). It is apparent that, by reason of the retaining ring 58, the clutch member 18a and the shaft 23 on which it is mounted will follow such rearward relative movement of the sleeve 60, thereby to prevent engagement of the complementary parts of the chucking clutch so long as the dogs 62 fail to register with the recesses 22. As seen in Fig. 4, a pin 73 is axially slidable within the transmission box 61 and is urged axially forward by a spring 44 to abut against the sleeve 60. Thus, when the sleeve 60 has rearward movement imparted thereto relative to the box 61, as described above, the pin 73 is also moved rearwardly relative to transmission box 61 thereby to engage an actuating member of a normally open switch 74 (Figs. 1, 2 and 4) for closing the latter. The switch 74 is interposed in a power supply circuit for the motor 20 so that, upon closing of the switch 74 in response to rearward relative movement of the sleeve 60, the motor 20 is energized to rotate the shafts 41 and 75. Since the clutch member 18a has also been moved rearwardly relative to the transmission box 61 in response to rearward relative movement of the sleeve 60, rotation of the shaft 75 in response to closing of the switch 74 is not transmitted to the chucking nut 17.

However, a gear 76 is fixed on the shaft 75 and meshes with a pinion 77 which, in turn, meshes with an internal gear 72 formed on a sleeve 71 which is rotatable within the transmission box 61 (Fig. 4). The sleeve 71 is urged axially forward against a stop 46 by springs 47 (Fig. 4) and, at its forward end, carries clutching teeth 48 adapted to mesh with cooperative clutching teeth 49 formed on the back end of a sleeve 69 which is rotatable on the sleeve 60 and constrained to move axially with the latter by a collar or rib 68 extending from the sleeve 60 and engaging in a corresponding annular groove in the sleeve 69. The sleeve or bushing 69 is rotationally coupled with the rotatable entraining sleeve 64, for example, by axial lugs or projections 50 on the sleeve 69 which are axially slidable in axially opening recesses 50a provided in the adjacent edge of sleeve 64. The sleeve or bushing 69 is axially dimensioned so that, when the dogs 62 of the blocking clutch are in their normal projecting positions, as illustrated in Fig. 4, the clutching teeth 48 and 49 on the sleeves 71 and 69, respectively, will be disengaged. However, when the sleeve 60 is displaced rearwardly relative to the transmission box 61, as previously described, the sleeve 69 is similarly rearwardly displaced to engage the clutching teeth 48 and 49 so that the sleeves 69 and 64 will be rotated by way of the gears 72, 77 and 76 in response to rotation of the shaft 75 by the motor 20 upon closing of the switch 74.

From the above, it will be apparent that, when the transmission box 61 is moved forwardly toward the spindle 11 at the related working station and the dogs 62 do not register with the recesses 22 of the blocking means, the relative rearward movement of the sleeve 60 will cause both closing of the switch 74 to effect operation of the motor 20 and, at the same time, the engagement of the clutching teeth 48 and 49 so that the entraining sleeve 64 will be rotated in contact with the friction disc 63 on flange 21 thereby to slowly turn the spindle 11 until the recesses 22 are disposed to receive the dogs 62. When the dogs 62 are received within the recesses 22, the sleeve 60 is returned forwardly relative to the transmission box 61 by the spring 45, whereupon the switch 74 returns to its normally open condition, to interrupt operation of the motor 20, and the clutching teeth 48 and 49 are again axially separated so that, when the motor is again energized to effect rotation of the chucking nut 17 by way of the engaged chucking clutch, the entraining sleeve 64 will not also be rotated.

As seen in Fig. 1, the axial movements of the transmission box 61 and of the sleeve 24 associated with the drive clutch 12 and the brake 25 are jointly controlled by an arrangement that includes the usual camshaft 27 of the automatic lathe carrying a drum cam 28 having suitably contoured grooves 29 and 30 therein for respectively controlling the movements of the box 61 and the sleeve 24. The illustrated control arrangement further includes slides 33 and 38 which are movable along support rods 34. A lever 31 is pivotally mounted intermediate its ends and, at one end, carries a follower engaging in the cam groove 29 so that the lever 31 is suitably rocked in response to turning of the cam 28 with the shaft 27. The other end of the lever 31 is pivotally connected to a rod 32 which, by way of a spring member 65, is connected to the slide 33. Further, the slide 33 is rigidly connected to the transmission box 61 by way of a member 35. Thus, when the lever 31 is rocked in the clockwise direction, as viewed in Fig. 1, the slide 33 and the transmission box 61 are moved toward the right, that is, in the direction toward the spindle 11.

It will be seen the pull exerted by the rod 32 for moving the transmission box 61 in the direction toward the spindle at the related working station is transmitted to the slide 33 by way of the spring member 65 so that, when the end edge of the entraining sleeve 64 of transmission assembly 19 engages the friction disc 63 on flange 21, further rocking of the lever 31 in the direction for moving the transmission box toward the spindle only accomplishes compression of the spring member 65 and thereby avoids seizing of the entraining sleeve 64 against the friction disc 63.

Similarly, a lever 36 which is pivotally mounted intermediate its ends has a follower at one end engaging the cam groove 30, while the other end of the lever 36 is pivotally connected to a rod 37 which, by way of a spring member 66 is connected to the slide 38. A part 39 extending from the slide 38 engages in an annular groove 40 in the outer surface of sleeve 24 so that, in response to rocking of the lever 36 by cam groove 30, the sleeve 24 is moved axially to either engage the clutch 12 or apply the brake 25. As seen in Fig. 1, the spring member 66 is arranged so that it provides a yieldable connection between the rod 37 and the slide 38 when the lever 36 is rocked in the direction (couter clockwise as viewed in Fig. 1) for applying the brake 25. Further, a threaded rod 67 passes adjustably through the slide 38 and, at its end, is adapted to be engaged by a lug or abutment 31a provided on the lever 31 so that, after the sleeve 24 has been moved, toward the left as viewed in Fig. 1, in order to apply the brake 25, and the transmission box 61 is thereafter moved, toward the right as viewed in Fig. 1, so that the friction disc 63 on flange 21 will be turned slowly to register the recesses 22 with the dogs 62 of the blocking clutch, as previously described in detail, the abutment 31a will engage the rod 67 to move the slide 38 toward the right sufficiently to effect a slight or partial release of the brake 25 for permitting such slow rotation of flange 21 and spindle 11. Preferably, the spring 65 is provided with a substantially greater initial compression than the spring member 66 so that the latter may be overcome readily during such movement of the sleeve 38 by the action of the abutment 31a on lever 31 against the rod 67.

Although only the switch 74 has been illustrated, and that switch is controlled in response to rearward relative movement of the sleeve 60 upon movement of the transmission box 61 toward the spindle 11 for effecting the slow rotation of the latter until the blocking clutch has been engaged to rotationally position the spindle during the actuation of the chuck 13, it will be apparent that another conventional control circuit (not shown) is provided for energizing the motor 20 after the blocking means has been engaged and the chucking clutch 18a and 18b is also engaged to transmit the drive of the motor to the chucking nut 17. The motor may be connected to or disconnected from this control circuit by means of a push button arrangement which is worked by hand or in any other suitable way.

By way of summarizing the operation of the above described embodiment of the invention, it is to be noted that when any one of the spindles 11 arrives at the working station having the motor 20 and transmission assembly 19 located thereat, the rotated cam shaft 27 of the lathe turns the drum cam 28 to the position wherein the groove 30 causes displacement of sleeve 24 toward the left, as viewed in Figs. 1 and 3, so that the clutch 12 is disengaged, to interrupt the rotational coupling between the driven gear 12a and the spindle 11, while the brake 25 is applied in order to arrest the rotation of the spindle.

As the cam shaft 27 continues to rotate, the groove 29 of cam drum 28 effects axial displacement of the transmission box 61 toward the adjacent end of the spindle, that is, toward the right as viewed in Figs. 1 and 4. If the brake 25 has brought the spindle 11 to rest in the predetermined rotational position wherein the dogs 62 of the sleeve 60 register with, and are received in, the recesses 22 of the flange 21, then the sleeve 60 will move axially with the transmission box 61 through the entire displacement of the latter, so that the chucking clutch formed by the clutch member 18a on the forward end of shaft 23 and the cooperating recesses or teeth 18b provided on the back end of the chucking nut 17 will be engaged. Thereafter, the motor 20 can be operated to rotate the chucking nut 17 by way of hollow shaft 41, shaft 75, clutch 80a, 80b, shaft 23, and chucking clutch 18a, 18b. Rotation of the chucking nut 17 causes axial displacement of the extension 16 on which it is threaded and corresponding axial displacement of the plunger 15 which, as previously described in detail, effects radial movement of the jaws 14 of chuck 13. However, if as is frequently the case, the applied brake 25 brings the spindle 11 to rest in a rotational position in which the recesses 22 of flange 21 do not register with the dogs 62 of sleeve 60, then, during the axial displacement of the transmission box 61 toward the spindle, sleeve 60 will be displaced toward the left, as viewed in Fig. 4, with respect to the transmission box 61. Such movement of sleeve 60 relative to transmission box 61 will cause axial displacement of the pin 73 relative to transmission box 61 thereby to engage the actuating member of normally open switch 74 for closing the latter and automatically operating the motor 20.

The above mentioned axial movement of sleeve 60 relative to transmission box 61 will also cause retraction of the clutch member 18a so that the latter cannot engage the complementary member 18b of the chucking clutch. Further, the relative axial movement of sleeve 60 with respect to transmission box 61 will cause a corresponding movement of the sleeve 69 in order to engage the normally disengaged clutching teeth 48 and 49 provided on the sleeves 71 and 69, respectively. Thus, when the motor 20 is operated in response to closing of the switch 74, the rotation of shafts 40 and 75 is transmitted, by way of the gear 76 on shaft 75, the pinion 77 and the internal gearing 72 on sleeve 71, to the sleeve 69, and the latter is splined as at 50, to the entraining sleeve 64 which frictionally engages the friction disc 63 on flange 21 thereby to slowly turn the spindle 11 until the recesses 22 are disposed to receive the dogs 62. When the dogs 62 are received within the recesses 22, the sleeve 60 is returned forwardly relative to the transmission box 61 by the springs 45, whereupon the switch 74 returns to its normally open condition to interrupt the operation of the motor 20, and the clutching teeth 48 and 49 are again axially separated so that, when the motor is again energized to effect rotation of the chucking nut by way of the engaged chucking clutch 18a, 18b, the entraining sleeve 64 will not also rotate. It is apparent that the forward return of sleeve 60 relative to transmission box 61 under the influence of springs 45 will permit the spring 26 to urge shaft 23 axially in the direction toward spindle 11 for effecting the engagement of chucking clutch 18a, 18b.

From the above it will be apparent that, in the clamping mechanism embodying the present invention, the single motor 20 is employed both for effecting the slow rotation of the spindle 11 to the position where the blocking means becomes engaged and for actuating the chuck 13 in response to rotation of the nut 17. Such an arrangement employing a single motor for both functions obviously represents a substantial simplification over existing arrangements wherein separate motors are employed for effecting the slow rotation of the spindle to its blocked position and for actuating the chuck, respectively.

Although an illustrative embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What is claimed is:

1. In combination with first and second coaxial rotary members, a device for locating said first rotary member in a predetermined rotational position and for then rotating said second rotary member, said device comprising blocking means engageable only in said predetermined rotational position of said first rotary member to hold the latter in said rotational position, means for rotating said second rotary member including a driving motor and a clutch engageable for transmitting the drive of said motor to said second rotary member only when said blocking means is engaged, and auxiliary drive means also driven by said motor and operative only when said blocking means is disengaged to effect slow rotation of said first rotary member until the latter reaches said predetermined rotational position and permits engagement of said blocking means.

2. In combination with first and second coaxial rotary members; a single driving motor, and a transmission assembly, said transmission assembly and said first rotary member having cooperating parts thereon defining blocking means that is engageable only in a predetermined rotational position of said first rotary member to hold the latter in said position, said transmission assembly and said second rotary member having cooperating parts defining a clutch that is engageable only upon engagement of said blocking means, means driven by said driving motor for effecting rotation of said second rotary member and having said clutch interposed therein, and auxiliary drive means in said transmission assembly also driven by said motor and operative to slowly turn said first rotary member to said predetermined rotational position only when said cooperating parts of said blocking means are brought together with said first rotary member angularly displaced from said predetermined rotational position.

3. In combination with first and second coaxial rotary members; a device comprising a transmission assembly including a non-rotatable box movable axially toward and away from said rotary members, a single motor, drive shaft means in said box for rotation by said motor, blocking means including a non-rotatable part axially movable within said box and yieldably urged toward said rotary members to a projecting position and a cooperating part on said first rotary member shaped to axially interfit with said non-rotatable part when said box is moved toward the rotary members with said first rotary member in a predetermined rotational position thereby to hold said first rotary member in said position, said non-rotatable part of the blocking means being urged into said box by contact with said cooperating part on the first rotary member when said box is moved toward said rotary members with said first rotary member angularly displaced from said predetermined rotational position, clutch means engageable only when said parts of the blocking means are axially interfitted to transmit rotation from said drive shaft means to said second rotary member, means for causing operation of said motor in response to the movement of said non-rotatable part of the blocking means into said box from said projecting position, and auxiliary drive means also driven by said drive shaft means and operative to slowly turn said first rotary member in response to said movement of the non-rotatable part of the blocking means into the box until said first rotary member reaches said predetermined rotational position to permit axial interfitting of said parts of the blocking means, whereupon said non-rotatable part returns to said projecting position to halt operation of said motor and auxiliary drive means while said clutch means then engages to permit rotation of said second rotary member by subsequent operation of said motor.

4. The combination as in claim 3, wherein said clutch means includes cooperating parts on said second rotary member and transmission assembly, respectively, adapted for engagement in response to axial movement of said box toward said rotary members, the part of said clutch means on said transmission assembly being axially movable relative to said box and being urged toward said rotary members to an operative position, and means retracting said part of the clutch means on the transmission assembly away from said operative position thereof in response to the movement of said non-rotatable part of the blocking means into said box, thereby to prevent engagement of said parts of the clutch means.

5. The combination as in claim 4, further comprising toothed coupling means between said drive shaft means and said part of the clutch means on said transmission assembly, said toothed coupling means having inclined engaging tooth surfaces, and spring means holding together said tooth surfaces so that the torque capable of being transmitted from said motor by way of said clutch means is determined by the force exerted by said spring means.

6. The combination as in claim 3, wherein said auxiliary drive means includes a rotatable drive sleeve projecting, at one end, from said box, a frictional disk on said first rotary member adapted to be engaged by said drive sleeve when said box is moved axially toward said rotary members, transmission means within said box driven by said drive shaft means, normally disengaged coupling means between said transmission means and said drive sleeve, and means engaging said coupling means in response to the movement of said non-rotatable part of the blocking means into said box.

7. The combination as in claim 3, further comprising control means for effecting axial movement of said transmission box, brake means for arresting rotation of said first rotary member, control means for applying said brake means, and means effective to partly release said brake means upon movement of said box toward said rotary members for permitting turning of said first rotary member by said auxiliary drive means.

8. The combination as in claim 7, wherein said control means for applying said brake means includes a yieldable member interposed therein, and portions of said control means for applying said brake means and for moving said box toward said rotary members, respectively, are moved in opposite directions; and wherein said means effective to partly release said brake means includes engageable members carried by said portions to overcome said yieldable member and move said portions of the control means in the same direction upon movement of said box toward said rotary members.

9. The combination as in claim 3, wherein said means for causing operation of said motor includes a normally open switch adapted to be interposed in an energizing circuit for said motor, and an actuating pin slidably carried by said box and yieldably urged against said non-rotatable part of the blocking means in the direction toward said rotary members, said actuating pin being operative to close said switch upon displacement of said pin by movement of said non-rotatable part into said box.

References Cited in the file of this patent

UNITED STATES PATENTS

| | | |
|---|---|---|
| 1,479,178 | Harvey | Jan. 1, 1924 |
| 1,986,494 | Battaline | Jan. 1, 1935 |
| 2,151,724 | Wengel | Mar. 28, 1939 |
| 2,192,437 | Groene | Mar. 5, 1940 |
| 2,471,863 | Church | May 31, 1949 |
| 2,537,269 | Harding | Jan. 9, 1951 |
| 2,646,152 | Retz | July 21, 1953 |
| 2,779,447 | Retz | Jan. 29, 1957 |
| 2,807,973 | Meyer | Oct. 1, 1957 |

FOREIGN PATENTS

| | | |
|---|---|---|
| 416,153 | Great Britain | Sept. 13, 1934 |